United States Patent [19]

Hunger et al.

[11] Patent Number: 4,630,836
[45] Date of Patent: Dec. 23, 1986

[54] DRILL CHUCK FOR USE IN PERCUSSION DRILLING

[75] Inventors: Josef Hunger, Olching; Anton Neumaier, Fürstenfeldbruck, both of Fed. Rep. of Germany

[73] Assignee: Hilti Aktiengesellschaft, Liechtenstein

[21] Appl. No.: 820,833

[22] Filed: Jan. 21, 1986

Related U.S. Application Data

[63] Continuation of Ser. No. 589,874, Mar. 15, 1984, abandoned.

[30] Foreign Application Priority Data

Mar. 21, 1983 [DE] Fed. Rep. of Germany ....... 3310147

[51] Int. Cl.4 ............................................. B23B 31/04
[52] U.S. Cl. ........................................ 279/19; 279/66; 279/123
[58] Field of Search ................. 279/60, 61, 62, 63, 279/64, 65, 55, 58, 59, 66, 67, 74, 123, 19, 69, 19.3

[56] References Cited

U.S. PATENT DOCUMENTS

| 93,108 | 7/1869 | Miller | 279/64 |
|---|---|---|---|
| 241,926 | 5/1881 | Chillingworth | 279/123 |
| 489,862 | 1/1893 | Blessing | 279/69 |
| 1,214,542 | 2/1917 | Haeseler | 279/19.3 |
| 1,224,780 | 5/1917 | Parsons | 279/123 |
| 1,647,201 | 11/1927 | Smickle | 279/60 |
| 1,918,439 | 7/1933 | Warman | 269/258 |
| 1,940,405 | 12/1933 | Englund | 279/61 |
| 3,558,146 | 1/1971 | Mayers | 279/123 |
| 3,737,170 | 6/1973 | Wanner et al. | 279/60 |

FOREIGN PATENT DOCUMENTS 2030485  4/1980  United Kingdom .................. 279/19

Primary Examiner—Gil Weidenfeld
Assistant Examiner—Daniel W. Howell
Attorney, Agent, or Firm—Toren, McGeady, Stanger, Goldberg & Kiel

[57] ABSTRACT

In a chuck for use in a drilling device, such as a hammer drill, capable of performing rotary or rotary/percussion drilling, clamping jaws are provided to secure a tool in the drilling device. The clamping jaws each have a convex surface transverse to the chuck axis and with the surface directed inwardly toward the axis. The more radially inward portion of the convex surface has a V-shaped notch extending in the axial direction of the chuck. The notch forms a pair of spaced edges which grip the surface of the tool secured in the chuck so that the tool can be reliably rotated.

2 Claims, 4 Drawing Figures though corresponding recesses can be secured in such a chuck. Drilling tools with a smooth, cylindrical shank cannot be held in such a chuck, because the friction generated is usually insufficient for this type of equipment for the reasons mentioned above.

DRILL CHUCK FOR USE IN PERCUSSION DRILLING

This is a continuation of application Ser. No. 589,874, filed Mar. 15, 1984 now abandoned.

SUMMARY OF THE INVENTION

The present invention is directed to a drill chuck usable for rotary drilling and for rotary/percussion drilling, such as in a drill hammer, and the chuck has at least two radially adjustable clamping jaws with the clamping surfaces directed inwardly toward the axis of the chuck being convexly shaped transverse to the axis.

In the past drill chucks with radially adjustable clamping jaws have been used exclusively in drilling and percussion drilling machines. In some of these drill chucks, the clamping jaws have clamping surfaces which are convex in transverse section. The term "convex" means not only the typical curved convex surface but also surfaces with a generally convex configuration but being formed of rectilinear lines and having a generally triangular, rectangular, trapezoidal or polygonal shape. The rotational movement is transmitted from the clamping jaws to the shank of the tool within the chuck only by means of friction. In percussion drilling devices, the drill tool along with the chuck perform, in addition to the rotary motion about the chuck axis, a certain reciprocating motion in the direction of the chuck axis. The reciprocating force active in such a drilling device is so small, however, that in most instances the frictional connection between the clamping surfaces in the chuck and the tool shank are sufficient.

The forces generated in a drill hammer, however, are entirely different. In such a drilling device, separate strong forces are transmitted to the drilling tool. The frictional connection between the clamping surfaces and the tool shank are insufficient to hold the tool. Therefore, it has been common practice in hammer drills to use a tool holder with locking elements fitting into form locking engagement with recesses in the tool shank.

In addition to tool holders for a given tool shank diameter, there are known chucks for drill hammers which have radially adjustable clamping surfaces. These clamping jaws have lugs or projections which serve as locking elements. Accordingly, only drilling tools with corresponding recesses can be secured in such a chuck. Drilling tools with a smooth, cylindrical shank cannot be held in such a chuck, because the friction generated is usually insufficient for this type of equipment for the reasons mentioned above.

Accordingly, the primary object of the present invention is to provide a chuck for a drilling device which can be operated either for rotary drilling or rotary/percussion drilling, such as a hammer drill, and the chuck is constructed to accommodate drilling tools with a smooth-cylindrical shank or drills with shanks shaped to receive form-locking members. Further, in such a chuck it is possible to secure drilling tools with different diameter shanks.

In accordance with the present invention, the clamping jaws in the chuck or tool holder are provided at the more radially inward portion of the clamping surface with a notch extending in the axial direction over the full axial length of the clamping surface.

Due to the arrangement of the notch, two edges are formed which engage the tool shank inserted into the chuck. Since the clamping surface is convex, that is, it projects radially inwardly, the edges of the notch form knife-like edges with a wedge angle which is relatively large so that the wear on the clamping jaws is slight. The edges of the notch penetrate the tool shank for a very small amount and leave virtually no permanent impression. If a drilling tool is used with recesses in the shank, the clamping jaws can engage within the recesses in a form-locking manner, that is, the convexly shaped surfaces fit into the recesses. The engagement of the drilling tool shank in the chuck is not affected by the notch located at the more radially inward portion of the convex surface on the clamping jaw.

The notch may be of different shapes. For producing the notch, and for ensuring adequate engagement with the drilling tool, it is preferable if the notch is V-shaped in transverse section. The formation of the V-shaped notch does not provide any problems in hardened or partly hardened metal clamping jaws when formed with an appropriate grinding wheel. To reduce the notch effect in the clamping jaws, the base of the V-shaped notch may be rounded.

For the optimum engagement of the clamping jaws with the drilling tool shank, it is advantageous if the included angle in the notch is in the range between 60° and 120°, preferably about 90°. Such an included angle results in solid edges engaging the drilling tool shank and also in affording a good pressure distribution in the clamping region.

To afford adequate engagement of the clamping jaws with the drilling tool shank and to avoid any impairment where the clamping jaws engage within recesses in the drilling tool shank, it is preferred that the spacing formed by the two edges of the notch, that is at the transition from the notch to the clamping surface, be in a range of 0.25 to 0.6 times the radius of the convex surface on the clamping jaws. In such an arrangement, the notch is large enough to hold drilling tools which have a smooth shank and also to accommodate a form-locking manner drilling tools with recesses in the shank. Accordingly, such a chuck has a universal use.

To use the chuck of the present invention for a wide range of drilling tool shank diameters, it must be possible, at times, to secure a very small diameter tool shank in the chuck. To hold such a small tool shank, it is advantageous if the spacing between the two edges of the notch which form the transition between the notch and the clamping surface is smaller than the smallest tool shank diameter to be secured in the chuck. As a result, such small diameter tool shanks are, in effect, guided in the V-shaped notches. Such an arrangement affords good concentricity and little wear on the inserted end of the tool shank.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
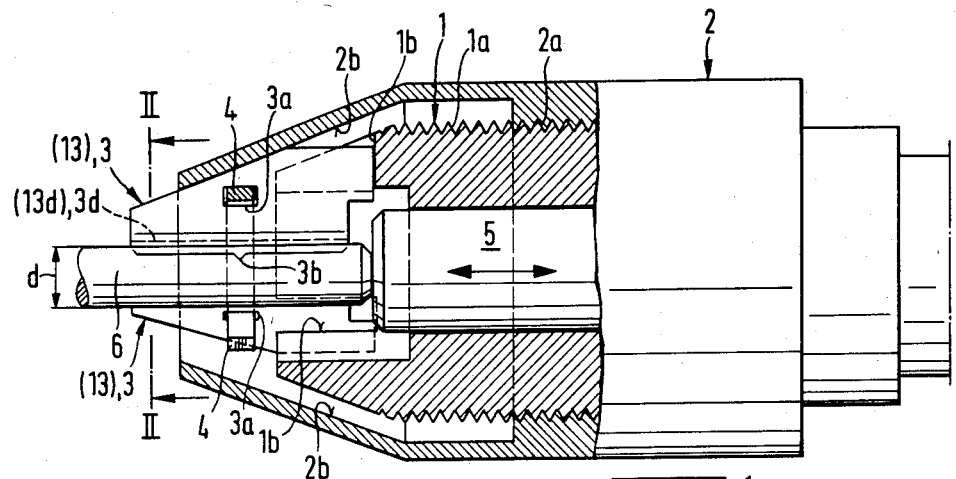
FIG. 1 is a side view of a chuck for a drilling device embodying the present invention, shown partly in axially extending section.

In FIG. 1 the chuck for a drilling device, such as a hammer drill, includes a chuck body 1 positioned within a chuck sleeve or jacket 2. The chuck body 1 has an external thread 1a in engagement with an internal thread 2a located within the chuck jacket 2. By rotating the chuck jacket or sleeve 2 relative to the chuck body 1 the sleeve can be moved in the axial direction.

As shown in FIG. 1, chuck body 1 has slots 1b extending in the radial and axial direction and a clamping jaw 3 is radially adjustably mounted in each slot. Each clamping jaw 3 has a circumferentially extending hole 3a containing an annular spring 4 so that the spring extends circumferentially around the chuck axis and biases the individual clamping jaws radially outwardly against an inside tapered surface 2b in the sleeve 2. As viewed in FIG. 1, the tapered surface 2b converges inwardly toward the axis of the chuck in the direction toward the front end or left-hand end of the chuck. By displacing the chuck sleeve 2 in the axial direction relative to the chuck body 1, the clamping jaws 3 are moved in the radial direction. A percussion anvil 5 is mounted in the chuck body 1 and is movable in the axial direction of the chuck, note the double-headed arrow in FIG. 1, so that the anvil can transmit percussive force to a drill tool held in the chuck. The anvil at its front end contacts the rear end faces of the clamping jaws 3 and the rear end of the drill tool shank 6 inserted into the chuck. The clamping surface 3b of the clamping jaws 3, in contact with the drill tool shank end 6 inserted into the chuck, face inwardly toward the axis of the chuck.

Figure 2:
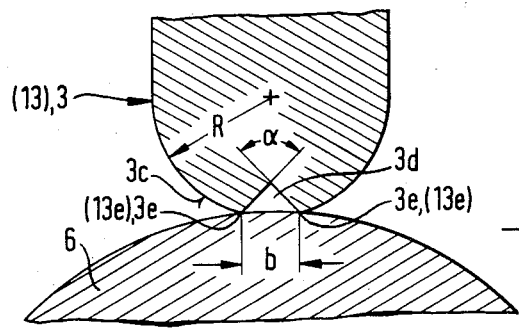
FIG. 2 is a transverse section of the clamping jaw of the chuck shown in FIG. 1 taken along the line II—II and illustrated on an enlarged scale.

As illustrated in FIG. 2, the transverse section of the clamping jaw 3, that is, transverse to the axis of the chuck, has a convex clamping surface 3c facing toward the drill tool shank 6. The centered or more radially inward portion of the clamping surface 3c contains a V-shaped notch 3d and the notch extends in the axial or long direction of the clamping jaws. Notch 3d forms an included angle α of about 90°. With such an included angle in the notch 3d, two cutting edges 3e are formed at the transition from the notch to the remainder of the clamping surface 3c. Each of the cutting edges 3e has a wedge angle of about 120°. Such cutting edges 3e are sharp enough to be pressed into the surface of the drill tool shank 6 inserted into the chuck. In addition, the shape of the cutting edges is such that they do not wear quickly. The spacing b between the cutting edges 3e is roughly half of the radius R of the convex clamping surface 3d of the clamping jaws 3. Note the radius R shown in FIG. 2. Such a dimensional relationship affords a good engagement of the clamping jaws 3 with the shank end 6 of the drilling tool without appreciably weakening the clamping jaws due to the formation of the notches 3d.

Figure 3:
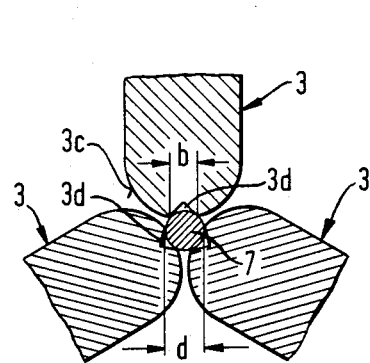
FIG. 3 is a transverse sectional view of a chuck embodying the present invention showing the smallest diameter of tool shank which can be held in the chuck.

In FIG. 3, three angularly spaced clamping jaws 3 embodying the present invention, are shown in holding engagement with the smallest diameter shank end 7 of a drilling tool which can be secured within the chuck. To ensure that the inserted shank end is reliably rotated, the width b between the edges of a notch 3d is smaller than the shank end diameter d on the inserted shank 7. To secure the small diameter drilling tool shank, the clamping jaws must be maintained in spaced relationship, that is, the adjacent clamping jaws must not be in contacting engagement.

Figure 4:
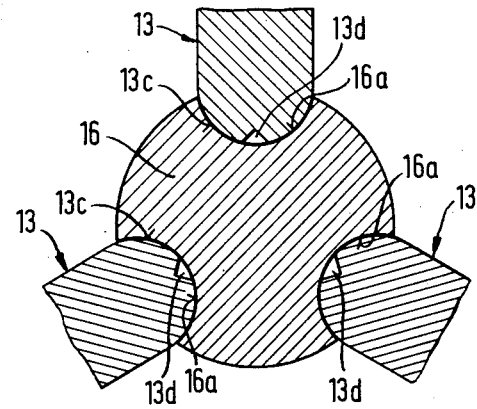
FIG. 4 is a transverse section of a chuck embodying the present invention with its clamping jaws in form-locking enagement with recesses in a drilling tool shank.

In FIG. 4 clamping jaws 13, in accordance with the present invention, are shown in another chuck arrangement. The clamping jaws 13 have an inwardly facing convexly shaped clamping surface 13c with a V-shaped notch 13d formed in and extending in the axial direction of the chuck along the clamping surface. As compared to the drilling tool shown in the other figures, the shank end 16 of the drilling tool in this figure is not completely smooth in the circumferential direction, instead it has three equiangularly spaced recesses 16a. As shown, the clamping jaws 13 extend into the recesses 16a in a form-locking manner. In this embodiment the notch 13d is not effective in the clamping action. The presence of the notch 13d, however, does not have any affect on the inserted shank end 16 of the drilling tool and the transmission of rotary movement and of impact energy to the tool is not impaired by the notch.

While specific embodiments of the invention have been shown and described in detail to illustrate the application of the inventive principles, it will be understood that the invention may be embodied otherwise without departing from such principles.

We claim:

1. A chuck for a drilling device operable for rotary drilling and rotary/percussion drilling, in the manner of a hammer drill, comprising axially extending chuck means forming an axially extending central opening for receiving a drilling tool, at least two radially adjustable clamping jaws elongated in the axial direction of said chuck means mounted in said chuck means and each having a clamping surface facing inwardly toward the center of the drill opening, said clamping surfaces being arcuately convex in the direction transverse to the axial direction of said chuck means and having a radius of curvature, wherein the improvement comprises that each said clamping surface has the same radius of curvature, the most radially inward portion of said convexly shaped surface of each said clamping jaw has a notch formed therein extending in the axial direction of said chuck means for approximately the full axial length of said clamping jaw, said notch is V-shaped in the transverse direction, the included angle of said notch is in the range of 60° to 120°, said V-shaped notch having a pair of edges spaced apart with said edges being located at the transition from said notch to said arcuately convex clamping surface, and the spacing in the circumferential direction relative to the axis of said chuck means between said edges being in the range of 0.25 to 0.6 times the radius of the arcuately convexly shaped clamping surface whereby said clamping jaws can be used with the edges of said notches gripping the shank of a drilling tool or with the clamping jaws fitted in correspondingly shaped recesses in the shank of a drilling tool.

2. A chuck, as set forth in claim 1, wherein the spacing of said spaced edges of said notch located at the transition from the notch to said clamping surface being smaller than the smallest diameter of a drilling tool shank to be secured within said chuck means, and the included angle of said notch is about 90°.

* * * * *